US011392223B2

(12) United States Patent
Santos et al.

(10) Patent No.: US 11,392,223 B2
(45) Date of Patent: Jul. 19, 2022

(54) RETRACTABLE ACTIVE STYLUS WITH DUAL WRITING FUNCTION

(71) Applicant: A.T. Cross Company, LLC, Providence, RI (US)

(72) Inventors: Donald Santos, Rehoboth, MA (US); Thomas Arthur Clem, Woonsocket, RI (US); Abhijat Vijay Mangrulkar, Cambridge, MA (US)

(73) Assignee: A.T. CROSS COMPANY, LLC, Providence, RI (US)

( * ) Notice: Subject to any disclaimer, the term of this patent is extended or adjusted under 35 U.S.C. 154(b) by 0 days.

(21) Appl. No.: 17/092,450

(22) Filed: Nov. 9, 2020

(65) Prior Publication Data
US 2022/0147165 A1    May 12, 2022

(51) Int. Cl.
*G06F 3/0354* (2013.01)
*G06F 3/038* (2013.01)

(52) U.S. Cl.
CPC .......... *G06F 3/03545* (2013.01); *G06F 3/038* (2013.01)

(58) Field of Classification Search
CPC .............................. G06F 3/03545; G06F 3/038
See application file for complete search history.

(56) References Cited

U.S. PATENT DOCUMENTS

| 5,913,629 | A | 6/1999 | Hazzard |
| 6,450,721 | B1 | 9/2002 | D'Amico et al. |
| 7,854,559 | B2 | 12/2010 | Liu |
| 8,803,851 | B2 | 8/2014 | Lin et al. |
| 2004/0125089 | A1 | 7/2004 | Chao et al. |
| 2008/0030486 | A1 | 2/2008 | Cook |
| 2013/0249870 | A1 | 9/2013 | Slaby et al. |
| 2020/0033986 | A1* | 1/2020 | Kämpf ................. G06F 3/04883 |
| 2020/0130404 | A1* | 4/2020 | Alford ....................... G06F 1/26 |

OTHER PUBLICATIONS

International Search Report issued in PCT Application No. PCT/US2019/58358, dated Oct. 29, 2018, pp. 1-4.
Office Action issued in U.S. Appl. No. 16/665,863 dated Feb. 11, 2022 (11 pgs).

* cited by examiner

*Primary Examiner* — Peter D McLoone
(74) *Attorney, Agent, or Firm* — Tutunjian & Bitetto, P.C.

(57) ABSTRACT

A user interface device includes a barrel, with a retractable active stylus positioned within the barrel. A cap portion connects to the barrel at a rotatable interface. A power source is positioned within the cap portion. A rotation-position switch connects the power source to activate the stylus when the cap portion is rotated to an "on" position.

19 Claims, 4 Drawing Sheets

RETRACTABLE ACTIVE STYLUS WITH DUAL WRITING FUNCTION

BACKGROUND

The present invention relates to styluses for use with electronic devices and, more particularly, to retractable active styluses.

Modern user interface devices use a variety of techniques to register the presence of a user's finger or a stylus. Passive touch screens rely on resistive or capacitive methods to register the proximity of an object to the screen. For example, a capacitive touch screen can register the presence of a stylus with a conductive tip—for example a piece of conductive foam—and can thereby accept inputs such as handwriting. Active input screens rely on active electrical properties of the stylus to trigger an input to the screen.

SUMMARY

A user interface device includes a barrel, with an active stylus positioned within the barrel. A cap portion connects to the barrel at a rotatable interface. A power source is positioned within the cap portion. A rotation-position switch connects the power source to activate the stylus when the cap portion is rotated to an "on" position.

A user interface device includes a barrel, with a retractable active stylus, positioned within the barrel. A cap portion that connects to the barrel at a rotatable interface. A power source is positioned within the cap portion. A rotation-position switch connects the power source to activate the stylus when the cap portion is rotated to an "on" position. A retraction mechanism, is positioned in the barrel, and is configured to deploy the stylus to extend a stylus tip past an end of the barrel, and to retract the stylus tip to be within the barrel, when the cap portion is rotated to respective "stylus deploy" and "stylus retract" positions. An electrical connection, between the retractable active stylus and the rotation-position switch, maintains connectivity when the stylus tip is deployed.

A user interface device includes a barrel, with a retractable active stylus and a writing instrument positioned within the barrel. A cap portion connects to the barrel at a rotatable interface. A power source is positioned within the cap portion. A rotation-position switch connects the power source to activate the stylus when the cap portion is rotated to an "on" position, and includes a first electrical contact, having a dimple and being positioned on the barrel, and a second electrical contact, having a curved surface to make contact with the dimple and being positioned on the cap portion. A retraction mechanism is positioned in the barrel, and is configured to deploy the stylus to extend a stylus tip past an end of the barrel, and to retract the stylus tip to be within the barrel, when the cap portion is rotated to respective "stylus deploy" and "neutral" positions, and to extend the writing instrument past the end of the barrel, and to retract the writing instrument to be within the barrel, when the cap portion is rotated to respective "writing deploy" and "neutral" positions. A flexible electrical connection, between the retractable active stylus and the rotation-position switch, maintains connectivity when the stylus tip is deployed and when disengages when the stylus tip is retracted.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Embodiments of the present invention provide an active stylus. The active stylus can include, for example, a retractable stylus tip and/or a rotatable power switch. In some embodiments, the active stylus can include a retractable pen or pencil tip, in addition to the retractable stylus tip, with the tip being selectable by a direction of rotation.

Figure 1:
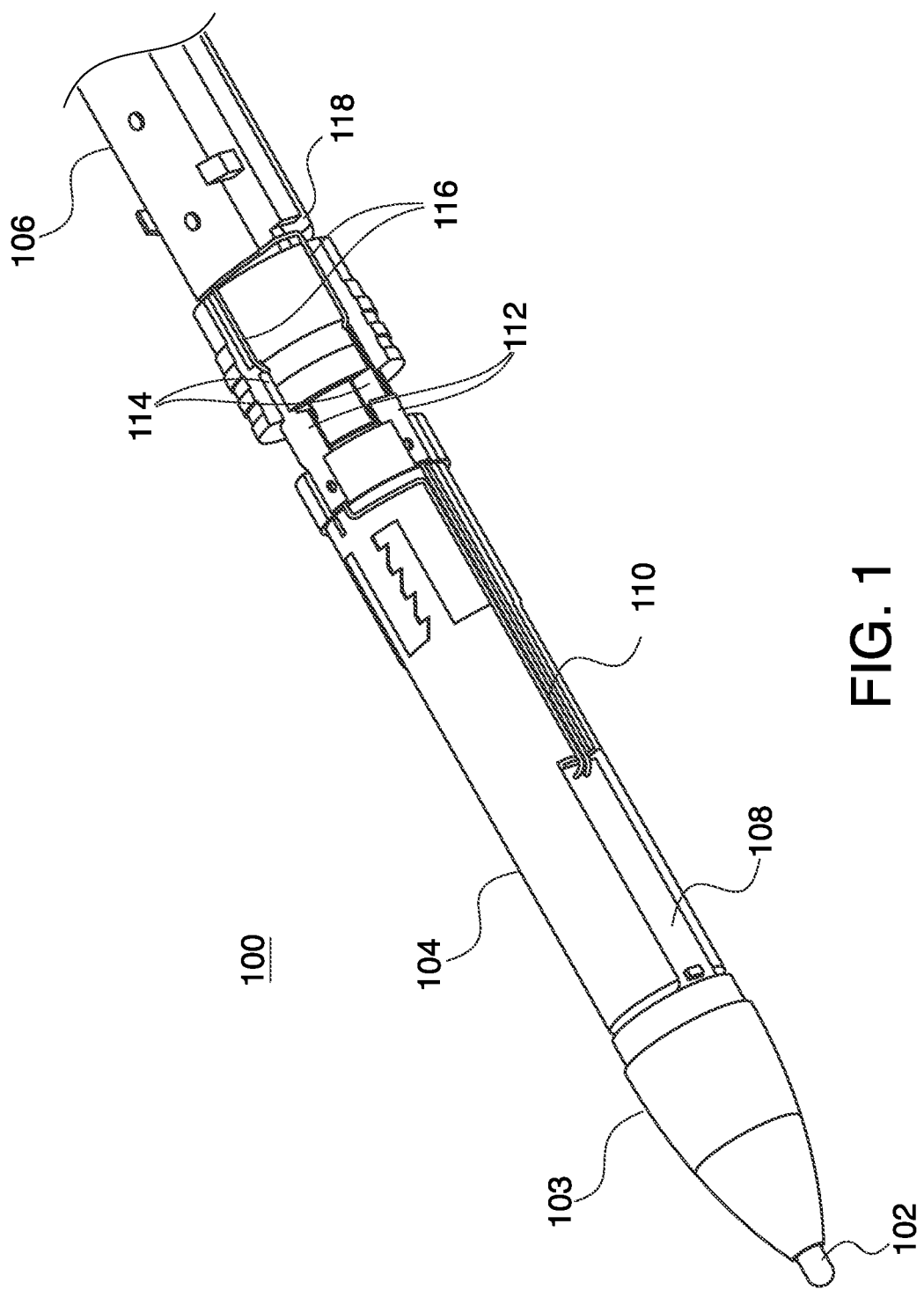
FIG. 1 is a diagram of a user interface device that includes a retractable, active stylus with a rotatable power switch, in accordance with an embodiment of the present invention.

Referring now to FIG. 1, a diagram of a stylus 100 is shown. The stylus 100 includes a stylus tip 102, a barrel 104, and a twistable cap portion 106. A tip cover 103 is removably connected to the barrel 104 and includes an opening, through which the stylus tip 102 extends. The twistable cap portion 106 is rotatably connected to the barrel 104. The stylus tip 102 is connected to a stylus printed circuit board (PCB) 108 that controls the active electrical properties of the stylus tip 102. The stylus tip 102 sends a signal to an electronic device, which the device can use to determine the location of the stylus relative to, e.g., a screen, button, or other interface surface.

The stylus PCB 108 is connected by barrel wires 110 to a set of barrel contacts 112. The barrel contacts 112 can be formed from any appropriate conductive material, such as copper or aluminum. The twistable cap portion 106 includes cap contacts 114. As the twistable cap portion 106 rotates with respect to the position of the barrel 104, electrical contact is formed between barrel contacts 112 and the cap contacts 114 in at least one "on" rotational position, and is broken in at least one "off" rotational position. The cap contacts 114 are connected by cap wires 116 to a battery 118 and to a battery PCB 120. The battery PCB 120 can provide a variety of functions, including voltage regulation during discharge of the battery 118, as well as during charging of the battery 118. The battery PCB 120 in particular regulates the power that is used by the stylus tip 102, and acts as an inlet for power from the battery 118 and from a charging input.

Although the use of a battery 118 is specifically contemplated, it should be understood that some embodiments may employ other forms of power sources. For example, the battery 118 and battery PCB 120 may be replaced with a wired power source that provides an appropriate current to the cap contacts 114, with the current being supplied by any appropriate external power supply. In other embodiments, the battery 118 can be replaced with a capacitor, supercapacitor, or other form of electrical energy storage. In yet other embodiments, the battery 118 can be replaced with an appropriate wireless power receiver.

When the twistable cap portion 106 is rotated to an "on" position, an electrical connection is made between the stylus tip 102 and the battery 118, allowing the stylus to operate and interact with a user interface device. When the twistable cap portion 106 is rotated to an "off" position, the electrical connection is broken between the stylus tip 102 and the battery 118, thereby conserving power and preventing accidental input.

In some embodiments, described in greater detail below, the rotational action between the barrel 104 and the twistable cap portion 106 also serves to deploy and retract the stylus tip 102. In such embodiments, the connection between the stylus tip 102 and the stylus PCB 108 is made flexible, to provide the ability for the stylus tip 102 to move with respect to the stylus PCB 108 and the barrel 104. In such embodiments, an "on" position between the barrel 104 and the twistable cap portion 106 can be made to correspond to the deployed position of the stylus tip 102, while an "off" position between the barrel 104 and the twistable cap portion 106 can be made to correspond to the retracted position of the stylus tip 102.

It should be understood that the present embodiments are shown without an outer surface, for the purposes of illustration. An outer surface or shell (not shown) can be positioned over the barrel 104 and the twistable cap portion 106 to protect the electrical components from damage. The outer surface can be formed from any appropriate material, and can be glued in place or can be attached by any other appropriate means.

Figure 2:
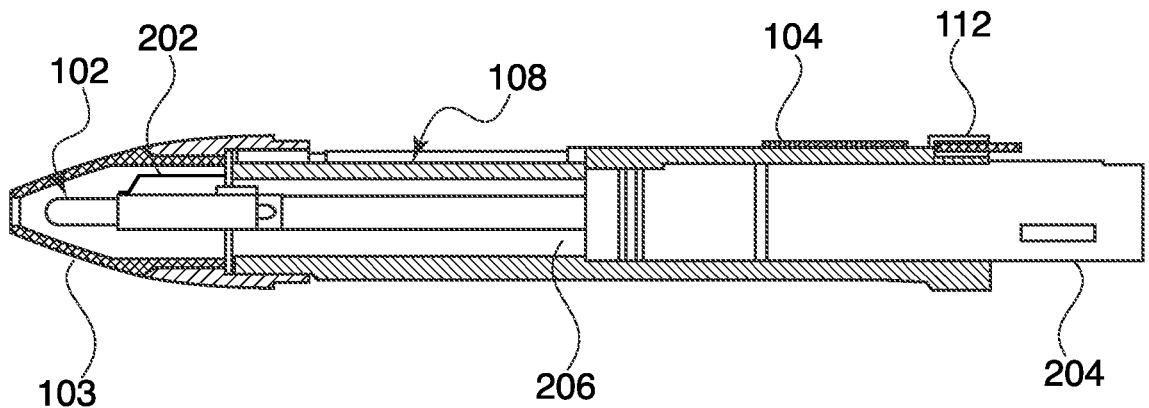
FIG. 2 is a cross-sectional view of a barrel of a user interface device that shows a flexible, extendable connection between an active stylus and control circuitry for the retractable stylus, in accordance with an embodiment of the present invention.

Referring now to FIG. 2, a cut-away view of the barrel 104 is shown. In this embodiment, the stylus tip 102 is retractable using the rotation of the twistable cap portion 106. The stylus tip 102 is shown in a retracted position, so that it does not extend past the end of the tip cover 103. The stylus extension tube 206 is extending back, into the barrel 104, where it interfaces with retraction mechanism 204. The retraction mechanism 204 can be fixed to the inner wall of the barrel 104, with a rotatable portion at its back end. As the twistable cap portion 106 rotates around the retraction mechanism 204, the stylus extension tube 206 is extended or retracted.

As the stylus extension tube 206 extends or retracts, it moves laterally past the stylus PCB 108. A flexible connector 202 provides an electrical connection between the stylus tip 102 and the stylus PCB 108. In some embodiments, the flexible connector 202 can be a piece of stamped metal, or other conductive material, that is soldered to the PCB 108 and that makes contact with the stylus extension tube 206. The flexible connector 202 may be mechanically biased to stay in contact with the stylus extension tube 206 by a spring force. Thus, as the stylus extension tube 206 extends and retracts past the flexible connector 202, the electrical connection between the stylus extension tube 206 and the flexible connector 202 can be engaged and disengaged as appropriate.

In some embodiments, the flexible connector 202 can be a flexible wire or ribbon connector. In some embodiments, the flexible connector 202 can be folded between the stylus extension tube 206 and the stylus PCB 108. In some embodiments, the flexible connector 202 can be attached to the stylus tip 102 by solder or by a mechanical (e.g., clamp or crimp) connection. It is specifically contemplated that the flexible connector 202 can be, for example, a stamped piece of flexible metal, for example being formed from a copper alloy or stainless steel. While these materials are specifically contemplated, it should be understood that any appropriately flexible conductive material can be used instead. The length of the flexible connector 202 may be fixed, and configured to stay in contact with the stylus tip due to spring-like tension in the connector 202.

In other embodiments, the flexible connector 202 can be formed from nickel- or chrome-plated copper wire. While these materials are specifically contemplated, it should be understood that any appropriately flexible conductive material can be used instead. In wire-based embodiments, the flexible connector can be between about 15 nm and about 25 nm, with a particularly contemplated embodiment being about 20 nm. The length of the flexible connector 202 is dictated, in part, by the distance of travel of the stylus tip 102 between the neutral position and the extended position.

Figure 3:
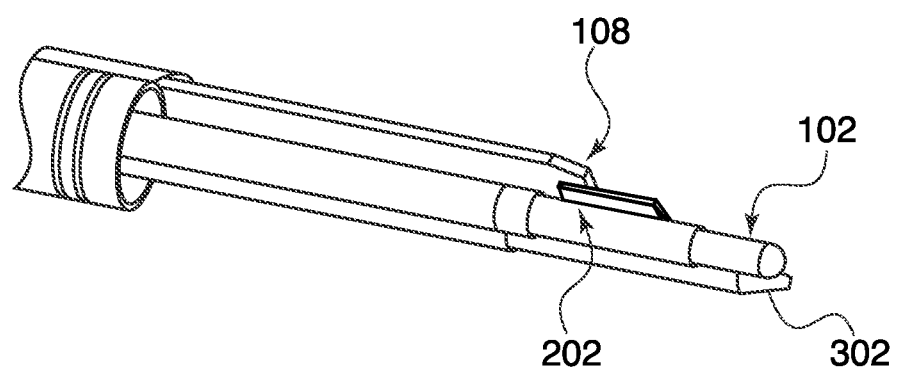
FIG. 3 is a cut-away view of a retractable stylus and a retractable writing instrument, both of which can be positioned within a barrel of a user interface device, in accordance with an embodiment of the present invention.

Referring now to FIG. 3, an embodiment is shown that includes both a stylus 102 and a writing instrument 302. The stylus extension tube 206 and the writing instrument 302 are positioned side-by-side within the barrel 104, and both interface with the retraction mechanism 204. When the twistable cap portion 106 is rotated from a neutral position in a first direction (e.g., clockwise or counter-clockwise), the stylus tip 102 is extended. When the twistable cap portion 106 is rotated from a neutral position in a second direction (e.g., opposite the first direction), the writing instrument 302 is extended. When the twistable cap portion 106 is rotated back to the neutral position from either extended position, either the extended stylus tip 102 or the extended writing instrument 302 is retracted. In some embodiments, when the twistable cap portion 106 is in the neutral position, nothing extends past the end of the tip cover 103.

The barrel contacts 112 and the cap contacts 114 can be positioned such that the contacts will only be in an "on" position, and will only form an electrical connection, when the stylus tip 102 is extended. The barrel contacts 112 and the cap contacts 114 can further be positioned such that the contacts will be in an "off" position when the twistable cap portion 106 is in the neutral position or when the writing instrument 302 is extended.

It should be understood that any appropriate writing instrument can be used in the present embodiments. For example, the writing instrument 302 can include a pen, such as a ballpoint pen or rollerball pen. The writing instrument 302 can be removable, for example when the tip cover 103 is detached, to facilitate replacement of a refill for the writing instrument 302.

The retraction mechanism 204 provides, e.g., 90° motion in both a clockwise and a counter-clockwise direction from a neutral position. The motion of the retraction mechanism 204 propels and retracts the writing instrument 302 and the stylus tip 102. For example, if the stylus is desired, the cap assembly can be twisted by 90° from the neutral position, and the retraction mechanism 204 propels the stylus tip 102 outward. When the cap assembly is twisted back to the neutral position, the stylus tip 102 retracts. To use the writing instrument 302, the cap assembly is twisted in the opposite direction, and the retraction mechanism 204 propels the writing instrument 302.

Figure 4:
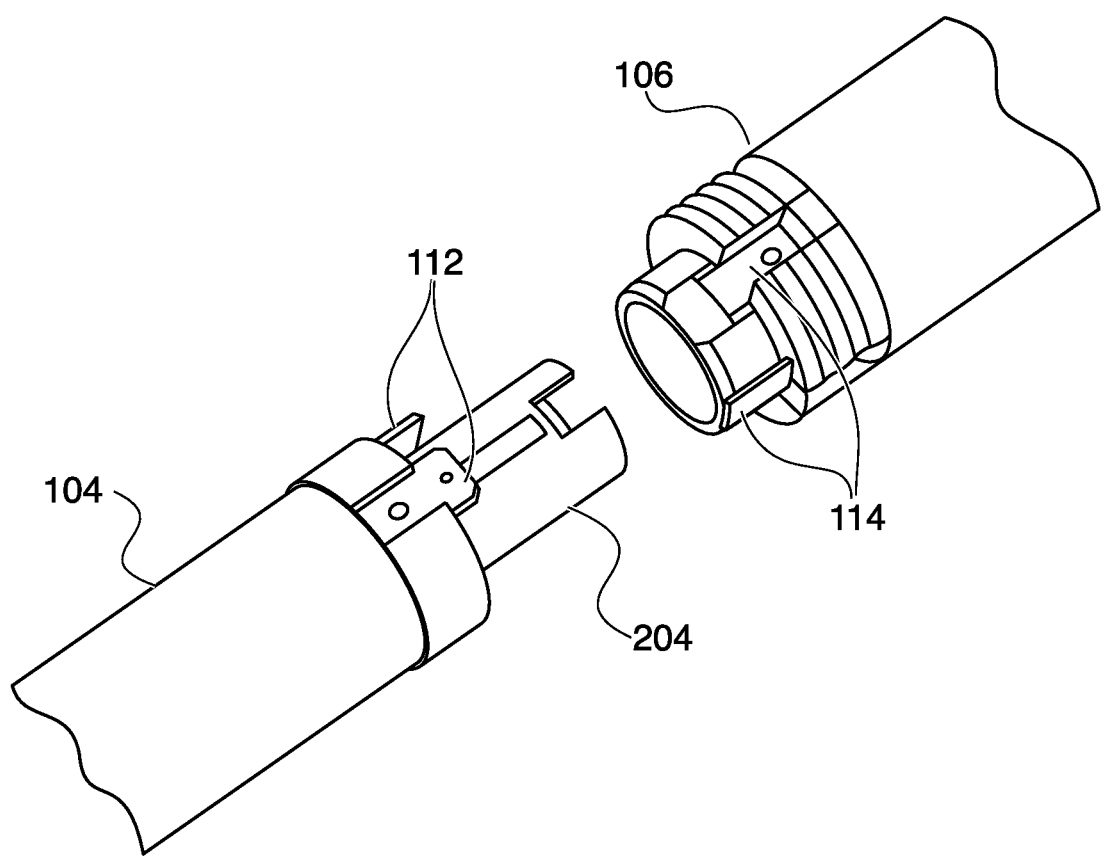
FIG. 4 is a diagram of an interface between a barrel portion and a twistable cap portion of a user interface device, showing electrical connections in a rotation-position switch, in accordance with an embodiment of the present invention.

Referring now to FIG. 4, additional detail is shown of the connection between the barrel 104 and the twistable cap portion 106. The back end of the retraction mechanism 204 engages with the inner surface of the twistable cap portion 106. The barrel contacts 112 and the cap contacts 114 are also shown, with the rotational position of the twistable cap portion 106 being in an "off" position. In particular, the barrel contacts 112 are shown as being rotationally offset from their respective cap contacts 114, such that no electrical circuit is formed. In some embodiments, the twistable cap portion can twist in both rotational directions (e.g., clockwise and counter-clockwise) relative to the displayed neutral position, to deploy either the stylus tip 102 or the writing instrument 302.

In some embodiments, the barrel contacts 112 can be positioned ninety degrees from one another around the barrel 104, while the cap contacts 114 can be positioned ninety degrees from one another around the twistable cap portion 106. In embodiments where the retraction mechanism 204 deploys the stylus tip 102 after a ninety degree turn, one of the barrel contacts 112 and one of the cap contacts 114 can be in contact when the retraction mechanism 204 is in a neutral position. After a ninety-degree rotation of the twistable cap portion 106, both of the barrel contacts 112 will align with respective cap contacts 114 to form the electrical connection. In embodiments that include a writing implement 304, the rotation of the twistable cap portion 106 will turn the respective contacts farther out of alignment. It should be understood that these positions are described solely for the sake of illustration, and that any appropriate angular distance can be used between the contacts.

The barrel contacts 112 can be formed from, e.g., a stamped metal, such as copper, and may include dimples 502 for an interference connection with the cap contacts 114. The cap contacts 114, meanwhile, can be formed from, e.g., a stamped metal, and may include a curved surface for smooth connection with the dimples.

When the cap assembly is rotated relative to the barrel, the cap contacts 114 comes into contact with the barrel contacts 112. It should be understood that the cap contacts 114 are positioned on the cap assembly in locations that will make contact with the barrel contacts 112 only when the stylus tip 102 is deployed.

Figure 5:
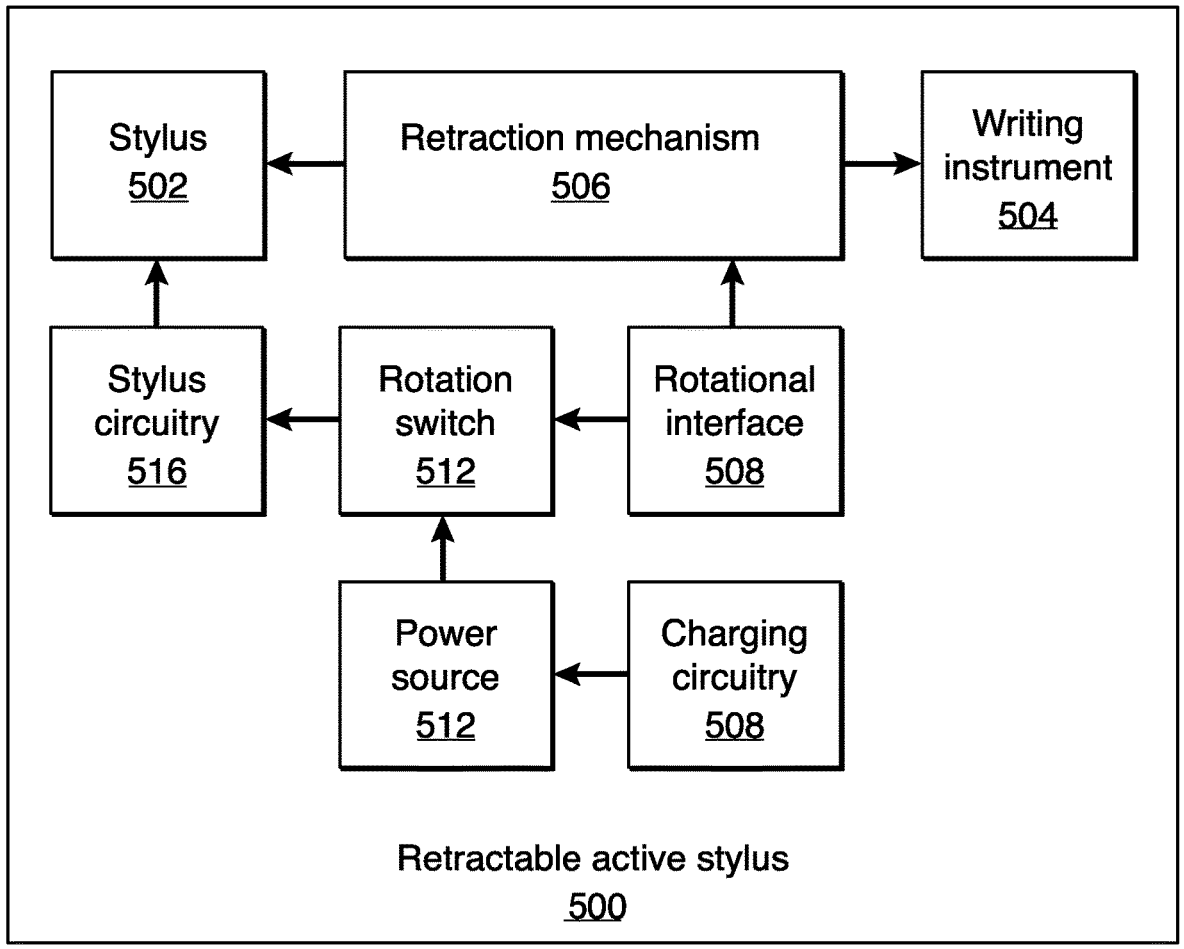
FIG. 5 is a block diagram showing functional relationships between components of a retractable active stylus, in accordance with an embodiment of the present invention.

Referring now to FIG. 5, a block diagram is shown that illustrates the functional relationships of a retractable active stylus device 500. The stylus 502 and writing instrument 504 are shown as being controlled by a retraction mechanism 506. The retraction mechanism 506, in turn is controlled by the rotational interface 508. As described above, the rotational interface 508 can represent the interface between the barrel 104 and the twistable cap portion 106.

The rotational interface 508 also controls the rotation switch 510, which turns "on" when barrel contacts 112 and cap contacts 114 align, as described above. The rotation switch 510 creates an electrical connection between a power source 512 and stylus circuitry 516. The stylus circuitry 516 provides power to the stylus 502 and controls how the stylus 502 interfaces with an input device, such as a touch screen. The power source 512 can be any appropriate power source, as described above, and in some embodiments can be charged through charging circuitry 514, for example by a wired or wireless electrical charging interface.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A user interface device, comprising:
   a barrel;
   an active stylus positioned within the barrel;
   a cap portion that connects to the barrel at a rotatable interface;
   a power source positioned within the cap portion;
   a rotation-position switch that connects the power source to activate the stylus when the cap portion is rotated to an "on" position; and
   an electrical connection in the barrel, between the stylus and the rotation position switch, that includes a flexible conductor in contact with the active stylus.

2. The user interface device of claim 1, wherein the rotation position switch includes a first electrical contact, that is positioned on the barrel and that connects to the stylus, and a second electrical contact, that is positioned on the cap portion and that connects to the power source.

3. The user interface device of claim 2, wherein the first electrical contact includes two conductive contacts, separated ninety degrees from one another around the barrel, wherein the second electrical contact includes two conductive contacts, separated ninety degrees from one another on the cap portion, and wherein the cap portion is in an "on" position when twisted to align the conductive contacts of the first electrical contact and the second electrical contact.

4. The user interface device of claim 2, wherein the first electrical contact comprises a dimple, and wherein the second electrical contact comprises a curved surface that makes contact with the dimple.

5. The user interface device of claim 1, further comprising a stylus control circuit interposed in the electrical connection between the rotation-position switch and the stylus.

6. The user interface device of claim 1, further comprising a retraction mechanism, positioned in the barrel, configured to deploy the stylus to extend a stylus tip past an end of the barrel, and to retract the stylus tip to be within the barrel, when the cap portion is rotated to respective "stylus deploy" and "stylus retract" positions.

7. The user interface device of claim 6, further comprising a writing instrument, positioned within the barrel.

8. The user interface device of claim 7, wherein the retraction mechanism is further configured to extend a writing instrument tip past an end of the barrel, and to retract the writing instrument tip to be within the barrel, when the cap portion is rotated to respective "writing deploy" and "writing retract" positions.

9. The user interface device of claim 8, wherein the "stylus retract" position and the "writing retract" position are the same position.

10. A user interface device, comprising:
    a barrel;
    a retractable active stylus, positioned within the barrel;
    a cap portion that connects to the barrel at a rotatable interface;
    a power source positioned within the cap portion;

a rotation-position switch that connects the power source to activate the stylus when the cap portion is rotated to an "on" position;

a retraction mechanism, positioned in the barrel, configured to deploy the stylus to extend a stylus tip past an end of the barrel, and to retract the stylus tip to be within the barrel, when the cap portion is rotated to respective "stylus deploy" and "stylus retract" positions;

an electrical connection, between the retractable active stylus and the rotation-position switch, including a flexible conductor contact with the active stylus to maintain connectivity when the stylus tip is deployed.

11. The user interface device of claim 10, wherein the rotation position switch includes a first electrical contact, that is positioned on the barrel and that connects to the stylus, and a second electrical contact, that is positioned on the cap portion and that connects to the power source.

12. The user interface device of claim 11, wherein the first electrical contact includes two conductive contacts, separated ninety degrees from one another around the barrel, wherein the second electrical contact includes two conductive contacts, separated ninety degrees from one another on the cap portion, and wherein the cap portion is in an "on" position when twisted to align the conductive contacts of the first electrical contact and the second electrical contact.

13. The user interface device of claim 12, wherein the first electrical contact comprises a dimple, and wherein the second electrical contact comprises a curved surface that makes contact with the dimple.

14. The user interface device of claim 13, further comprising a stylus control circuit interposed in the electrical connection between the rotation-position switch and the stylus.

15. The user interface device of claim 10, wherein the flexible conductor includes a flexible metal contact that is held to the stylus with a spring force.

16. The user interface device of claim 10, further comprising a writing instrument, positioned within the barrel.

17. The user interface device of claim 16, wherein the retraction mechanism is further configured to extend a writing instrument tip past an end of the barrel, and to retract the writing instrument tip to be within the barrel, when the cap portion is rotated to respective "writing deploy" and "writing retract" positions.

18. The user interface device of claim 17, wherein the "stylus retract" position and the "writing retract" position are the same position.

19. A user interface device, comprising:
a barrel;
a retractable active stylus, positioned within the barrel;
a writing instrument, positioned within the barrel;
a cap portion that connects to the barrel at a rotatable interface;
a power source positioned within the cap portion;
a rotation-position switch, that connects the power source to activate the stylus when the cap portion is rotated to an "on" position, and that includes a first electrical contact, having a dimple and being positioned on the barrel, and a second electrical contact, having a curved surface to make contact with the dimple and being positioned on the cap portion;
a retraction mechanism, positioned in the barrel, configured to deploy the stylus to extend a stylus tip past an end of the barrel, and to retract the stylus tip to be within the barrel, when the cap portion is rotated to respective "stylus deploy" and "neutral" positions, and to extend the writing instrument past the end of the barrel, and to retract the writing instrument to be within the barrel, when the cap portion is rotated to respective "writing deploy" and "neutral" positions;
a printed circuit board that receives power from the rotation-position switch; and
an electrical connection, between the retractable active stylus and the printed circuit board, including a flexible conductor in contact with the active stylus to maintain connectivity when the stylus tip is deployed.

\* \* \* \* \*